United States Patent
Bischel (10) Patent No.: US 9,765,891 B2
(45) Date of Patent: Sep. 19, 2017

(54) PRESSURIZED DRIVE SHAFT SEAL FOR DISPENSING SYSTEMS AND A METHOD FOR USING THE SAME

(71) Applicant: Carrier Commercial Refrigeration, Inc., Farmington, CT (US)

(72) Inventor: Kevin Henry Bischel, Rockton, IL (US)

(73) Assignee: Carrier Corporation, Jupiter, FL (US)

( * ) Notice: Subject to any disclaimer, the term of this patent is extended or adjusted under 35 U.S.C. 154(b) by 0 days.

(21) Appl. No.: 14/606,825

(22) Filed: Jan. 27, 2015

(65) Prior Publication Data

US 2015/0239726 A1 Aug. 27, 2015

Related U.S. Application Data

(60) Provisional application No. 61/943,534, filed on Feb. 24, 2014.

(51) Int. Cl.
*F16J 15/40* (2006.01)
*F16J 15/3236* (2016.01)
(Continued)

(52) U.S. Cl.
CPC ............ *F16J 15/3236* (2013.01); *A23G 9/22* (2013.01); *F16J 15/40* (2013.01); *F16J 15/46* (2013.01); *A23G 9/106* (2013.01); *B67D 3/0009* (2013.01); *F16C 33/1055* (2013.01); *F16C 33/72* (2013.01); *F16C 33/726* (2013.01); *F16C 41/005* (2013.01);
(Continued)

(58) Field of Classification Search
CPC .......... B67D 3/0009; A23G 9/12; A23G 9/14; A23G 9/16; A23G 9/20; A23G 9/22; A23G 9/106; F16C 41/005; F16C 33/10; F16C 33/1005; F16C 33/1055; F16C 33/72; F16C 33/726; F16J 15/16; F16J 15/162; F16J 15/182; F16J 15/32; F16J 15/324; F16J 15/3244; F16J 15/54; F16J 15/40; F16J 15/46; F16J 15/3236
USPC ......... 222/542, 333, 173, 146.1, 146.6, 108, 222/226–248, 402.24; 366/102, 138, 149;
(Continued)

(56) References Cited

U.S. PATENT DOCUMENTS

1,417,877 A * 5/1922 Wright ................. F04B 53/164
277/304
1,965,671 A * 7/1934 Schnetzler ............... F16J 15/40
277/304
(Continued)

*Primary Examiner* — Paul R Durand
*Assistant Examiner* — Andrew P Bainbridge
(74) *Attorney, Agent, or Firm* — Ice Miller LLP (57) ABSTRACT

A seal assembly including at least one conduit configured to allow a medium to flow therethrough, an annular retaining means operably coupled to the conduit, and an annular resilient seal member disposed in the annular retaining means. A method of sealing a dispensing system containing a food product creating a food product pressure, wherein the dispensing systems includes a drive shaft operably coupled to a seal assembly, the seal assembly including an annular resilient seal member disposed in an annular retaining member, the annular retaining member being operably coupled to at least one conduit, the method including the steps of: dispensing a medium through the at least one conduit to enter the annular resilient seal member to create a seal pressure greater than or equal to the food product pressure.

16 Claims, 7 Drawing Sheets

(51) Int. Cl.
*A23G 9/22* (2006.01)
*F16J 15/46* (2006.01)
*F16C 33/72* (2006.01)
*F16C 33/10* (2006.01)
*F16C 41/00* (2006.01)
*F16J 15/16* (2006.01)
*B67D 3/00* (2006.01)
*F16J 15/18* (2006.01)
*F16J 15/324* (2016.01)
*A23G 9/10* (2006.01)

(52) U.S. Cl.
CPC ............ *F16J 15/162* (2013.01); *F16J 15/182* (2013.01); *F16J 15/324* (2013.01)

(58) Field of Classification Search
USPC ............ 99/452–455; 62/342, 389; 277/500, 277/510–515, 927, 304, 387–388
See application file for complete search history.

(56) References Cited

U.S. PATENT DOCUMENTS

| | | | |
|---|---|---|---|
| 4,257,617 A * | 3/1981 | Hill | F16J 15/008 277/303 |
| 4,588,301 A | 5/1986 | Bolz | |
| 4,758,097 A * | 7/1988 | Iles, Sr. | A23G 9/163 366/102 |
| 4,836,420 A | 6/1989 | Kromrey | |
| 4,989,504 A * | 2/1991 | Jay | A01J 25/06 366/149 |
| 5,171,023 A | 12/1992 | Scott et al. | |
| 5,433,084 A | 7/1995 | Kaiser et al. | |
| 5,799,832 A | 9/1998 | Mayo | |
| 6,517,077 B1 | 2/2003 | Enomura | |
| 6,553,779 B1 * | 4/2003 | Boyer | A23G 9/045 222/146.6 |
| 6,572,261 B1 | 6/2003 | Angerhofer et al. | |
| 6,740,349 B2 | 5/2004 | Franklin et al. | |
| 6,997,601 B2 | 2/2006 | Feldmeier | |
| 7,229,076 B2 | 6/2007 | Kudari et al. | |
| 7,726,661 B2 * | 6/2010 | Orlowski | F16J 15/187 277/412 |
| 7,874,459 B2 * | 1/2011 | Harra | A23G 9/28 222/135 |
| 8,109,208 B2 * | 2/2012 | Bokelmann | A01J 25/04 277/349 |
| 2011/0254231 A1 * | 10/2011 | Isenberg | B01F 7/042 277/500 |

* cited by examiner

PRESSURIZED DRIVE SHAFT SEAL FOR DISPENSING SYSTEMS AND A METHOD FOR USING THE SAME

CROSS REFERENCE TO RELATED APPLICATIONS

The present application is related to, and claims the priority benefit of, U.S. Provisional Patent Application Ser. No. 61/943,534 filed Feb. 24, 2014, the contents of which are hereby incorporated in their entirety into the present disclosure.

TECHNICAL FIELD OF THE DISCLOSED EMBODIMENTS

The presently disclosed embodiments generally relate to food and beverage dispensing systems, and more particularly, to a pressurized drive shaft seal for dispensing systems and a method of using the same.

BACKGROUND OF THE DISCLOSED EMBODIMENTS

Generally, rear seal bearings operate to prevent food product from leaking between the freezing cylinders and the drive shaft of the stirring and scraping mechanism in frozen beverage machines and frozen soft-serve machines. However, rear seal bearings are a frequent source of leakage. Additionally, the rear bearing seals must be removed for cleaning and are often reinstalled incorrectly or damaged. There is, therefore, a need for improvements in rear seal bearings.

SUMMARY OF THE DISCLOSED EMBODIMENTS

In one aspect, a seal assembly is provided. In at least one embodiment, seal assembly includes at least one conduit configured to allow a medium to flow therethrough, an annular retaining member operably coupled to the at least one conduit, and an annular resilient seal member disposed in the annular retaining member.

In at least one embodiment, the annular retaining member includes a front surface, a rear surface, and at least one retaining member aperture penetrating the front surface through the rear surface. In at least one embodiment, the at least one retaining member aperture is configured to engage the at least one conduit on the front surface to allow the medium to enter the annular retaining member.

In at least one embodiment, the rear surface, of the annular retaining member, includes at least one resilient ridge to form at least one retaining member cavity therein. In at least one embodiment, the annular resilient seal member is disposed within one of the at least one retaining member cavities. In at least one embodiment, the annular resilient seal member includes a u-cup seal including a seal outer perimeter, a seal inner perimeter, and a seal central reservoir space. In at least one embodiment, at least one seal aperture penetrates the seal outer perimeter into the seal central reservoir. The at least one seal aperture is configured to allow the medium to pass from the at least one retaining member aperture into the seal central reservoir.

In one aspect, a dispensing system is provided. In at least one embodiment, the dispensing system includes a housing configured to contain a food or beverage product. In at least one embodiment, the housing is refrigerated. The dispensing system further includes a stirring mechanism disposed within the housing. The stirring mechanism is operably coupled to a drive shaft, which is operably coupled to a motor. The dispensing system further includes a dispensing mechanism operably coupled to the housing. The dispensing system further includes a seal assembly operably coupled to the housing, and configured to engage the drive shaft. In at least one embodiment, the drive shaft penetrates the seal assembly. In at least one embodiment, the seal assembly includes at least one conduit configured to allow a medium to flow therethrough, an annular retaining member operably coupled to the at least one conduit, and an annular resilient seal member disposed in the annular retaining member.

In one aspect, a method of sealing a dispensing system containing a food product creating a food product pressure, wherein the dispensing system includes a drive shaft operably coupled to a seal assembly, the seal assembly including an annular resilient seal member disposed in an annular retaining member, the annular retaining member being operably coupled to at least one conduit. The method includes the step of dispensing a medium through the at least one conduit to enter the annular resilient seal member to create a seal pressure greater than or equal to the food product pressure. In at least one embodiment, the medium is pressurized. In at least one embodiment, the pressurized medium includes a fluid. In at least one embodiment the fluid includes a food grade grease. In at least one embodiment the pressurized medium includes a gas. In at least one embodiment, the gas includes carbon dioxide.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
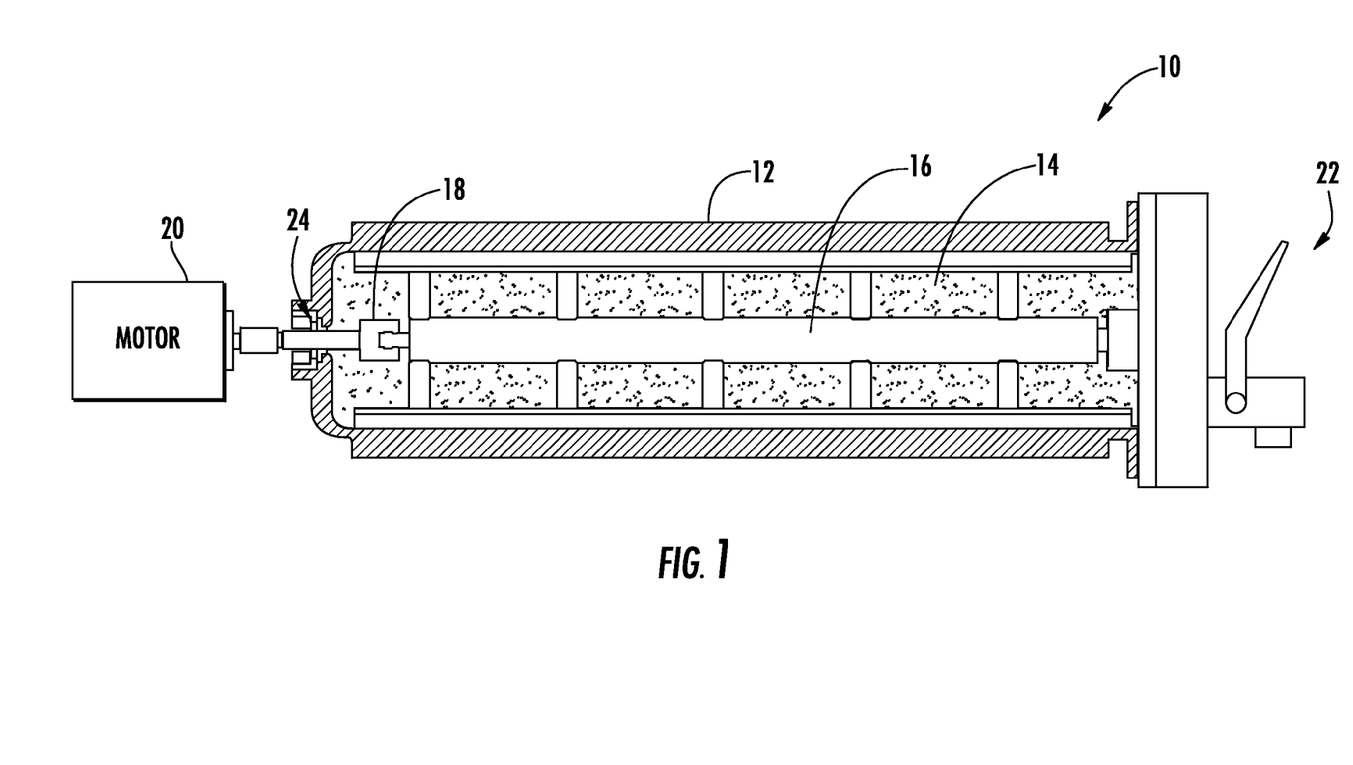
FIG. 1 is a cross-sectional schematic diagram of a dispensing system according to at least one embodiment of the present disclosure.

FIG. 1 illustrates a schematic cross-sectional diagram of a dispensing system, generally referenced at 10. In one embodiment, the dispensing system 10 includes a housing 12 configured to contain a food or beverage product 14. In at least one embodiment, the housing 12 is refrigerated. The dispensing system 10 further includes a stirring mechanism 16 disposed within the housing 12. The stirring mechanism 16 is operably coupled to a drive shaft 18, which is operably coupled to a motor 20. The motor 20 is configured to rotate the drive shaft 18, thereby rotating the stirring mechanism 16 to mix the food or beverage product stored within the housing 12. The dispensing system 10 further includes a dispensing mechanism 22 operably coupled to the housing 12. The dispensing mechanism 22 is configured to expel the food or beverage product 14 stored within the housing 12. The dispensing system 10 further includes a seal assembly 24 operably coupled to the housing 12, and configured to engage the drive shaft 18. In at least one embodiment, the drive shaft 18 penetrates the seal assembly 24.

Figure 2:
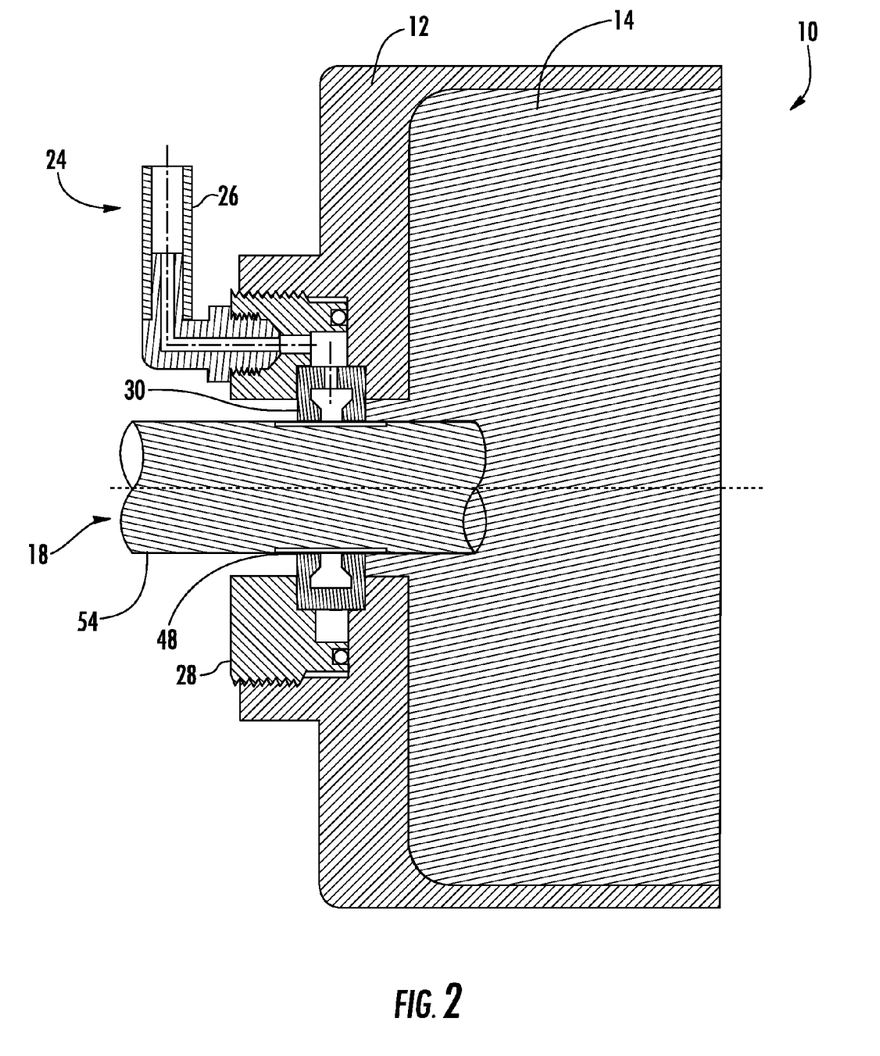
FIG. 2 is a cross-sectional schematic diagram of a dispensing system with a seal assembly according to at least one embodiment of the present disclosure.

As shown in FIG. 2, the seal assembly 24 includes at least one conduit 26 configured to allow a medium to flow therethrough. The seal assembly 24 further includes an annular retaining member 28 operably coupled to the at least one conduit 26. The seal assembly 24 further includes an annular resilient seal member 30 disposed in the annular retaining member 28.

Figure 3A:
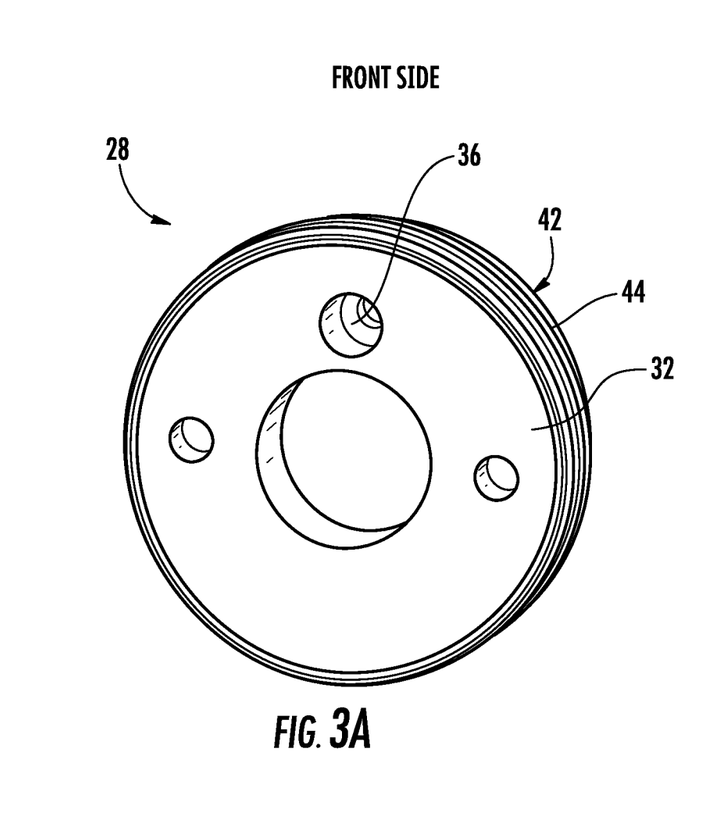
FIGS. 3A-B are perspective views of an annular retaining means according to at least one embodiment of the present disclosure.
Figure 3B:
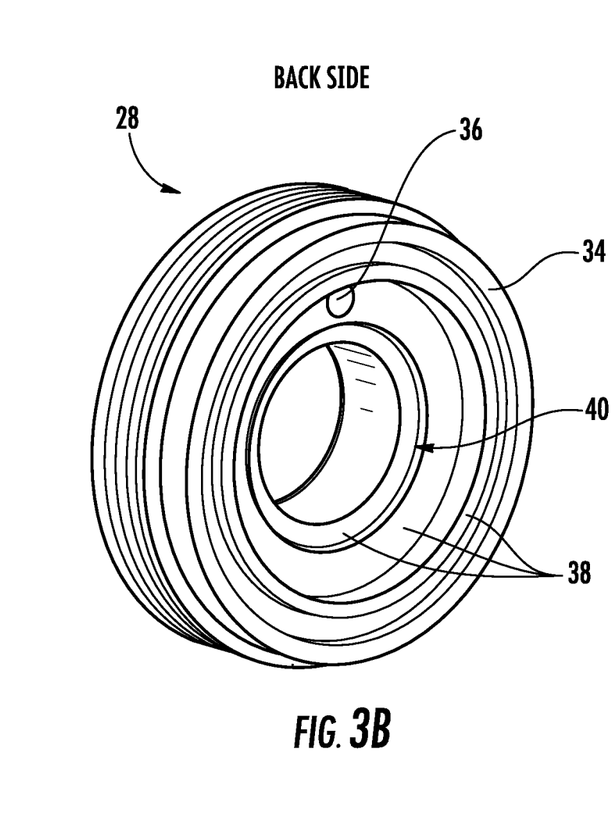

In at least one embodiment, as shown in FIGS. 3A and 3B, the annular retaining member 28 includes a front surface 32, a rear surface 34, and at least one retaining member aperture 36 penetrating the front surface 32 through the rear surface 34. In at least one embodiment, the at least one retaining member aperture 36 is configured to engage the at least one conduit 26 on the front surface 32 to allow the medium to enter the annular retaining member 28. It will be appreciated that the at least one retaining member aperture 36 may engage the at least one conduit 26 by any secure connection, for example a screw-type connection to name one non-limiting example.

In at least one embodiment, the rear surface 34 includes at least one ridge 38 to form at least one retaining member cavity 40 therein. In at least one embodiment, the annular resilient seal member 30 is disposed within one of the at least one retaining member cavities 40. The at least one retaining members cavities 40 is configured to securely hold the annular resilient seal member 30 (shown in FIGS. 4A and 4B) in place to provide an adequate seal assembly 24. It will be appreciated that an outer perimeter 42 of the annular retaining member 28 may include an attachment connection 44, for example screw-type threads to name one non-limiting example, to help secure the annular retaining member 28 to the housing 12.

Figure 4A:
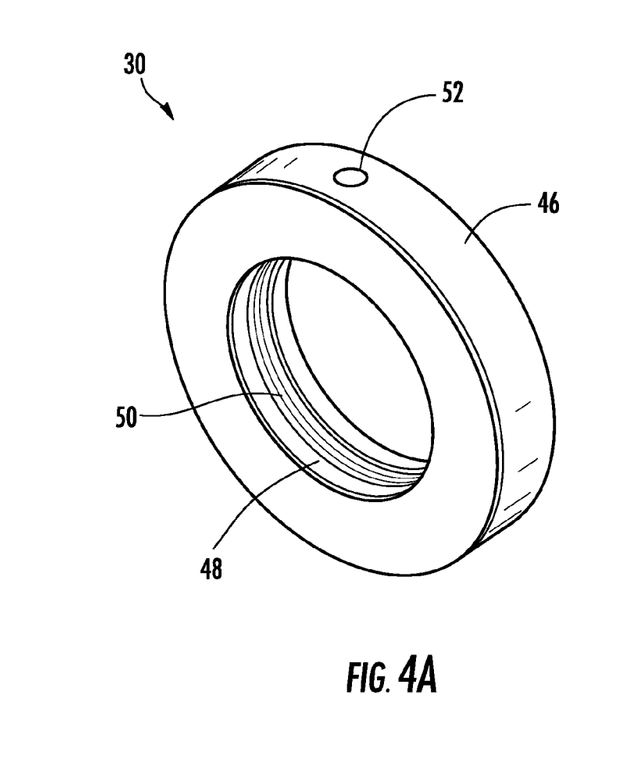
FIGS. 4A-B are perspective views of an annular resilient seal member according to at least one embodiment of the present disclosure.
Figure 4B:
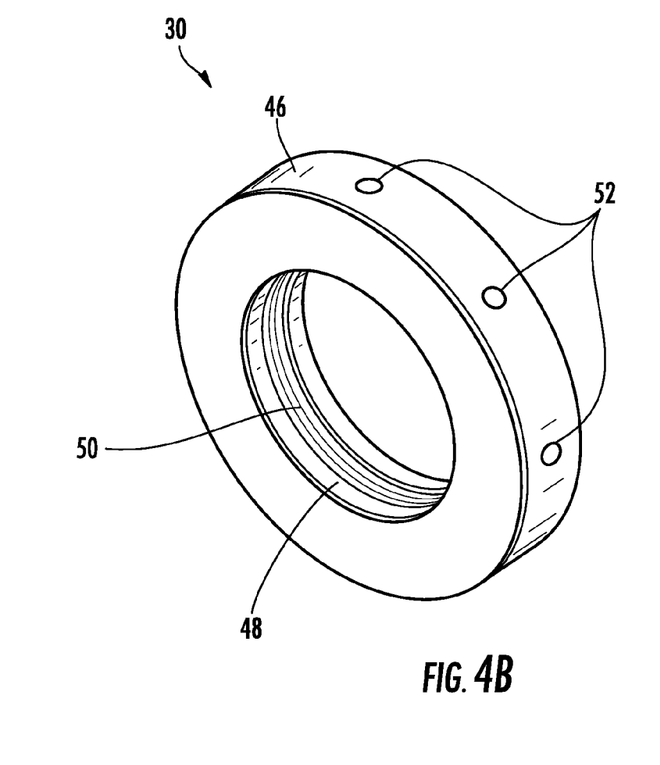

In at least one embodiment, as shown in FIGS. 4A and 4B, the annular resilient seal member 30 includes a u-cup seal including a seal outer perimeter 46, a seal inner perimeter 48, and a seal central reservoir space 50. In at least one embodiment, at least one seal aperture 52 penetrates the seal outer perimeter 46 into the seal central reservoir space 50. The at least one seal aperture 52 is configured to allow a medium to pass from the at least one retaining member aperture 36 into the seal central reservoir space 52.

In at least one embodiment, the drive shaft 18 penetrates the annular retaining member 28 and the annular resilient seal member 30 (as shown in FIG. 2). For example, the drive shaft 18 penetrates the center of the annular retaining member 28 and the annular seal member 30, such that the drive shaft outer surface 54 (shown in FIG. 2) of the drive shaft 18 is in contact with the seal inner perimeter 48.

Figure 5:
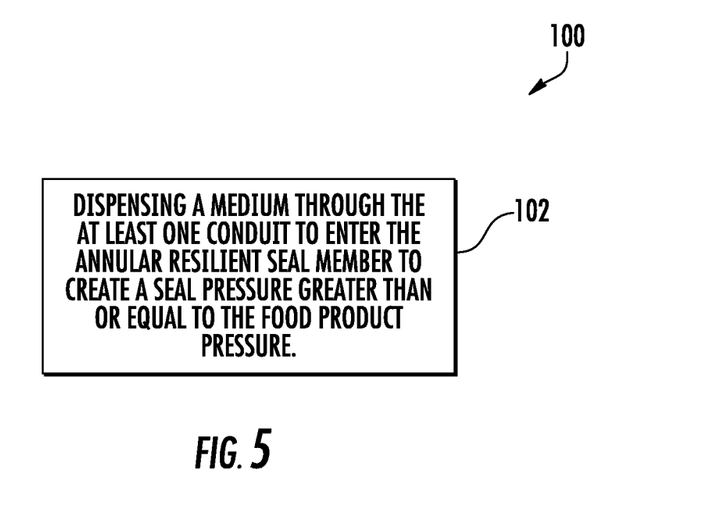
FIG. 5 is a schematic flow diagram of a method for sealing a dispensing system according to at least one embodiment of the present disclosure.
Figure 6:
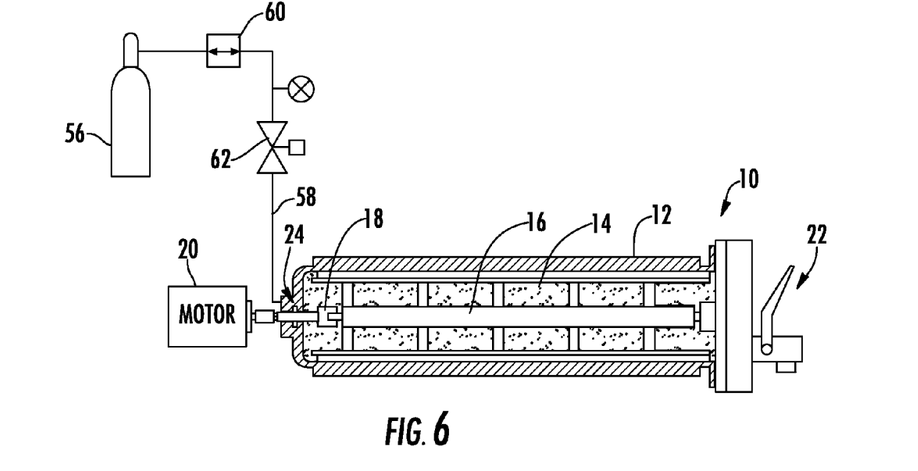
FIG. 6 is a cross-sectional schematic diagram of a dispensing system with a pressurized medium flowing through the seal assembly according to at least one embodiment of the present disclosure.

FIG. 5 illustrates a schematic flow diagram of a method 100 of sealing a dispensing system 10 containing a food product 14 creating a food product pressure, wherein the dispensing system includes a drive shaft 18, operably coupled to a seal assembly 24, the seal assembly 24 including an annular resilient seal member 30 disposed in an annular retaining member 28, the annular retaining member 28 being operably coupled to at least one conduit 26. The method includes the step 102 of dispensing a medium through the at least one conduit 26 to enter the annular resilient seal member 30 to create a seal pressure greater than or equal to the food product pressure. For example, food or beverage product 14 within the housing 12 produces a pressure on the drive shaft 18; thus, to prevent the food or beverage product 14 from flowing between the seal assembly 24 and the drive shaft 18, the seal pressure provided by the pressurized medium is greater than the pressure applied by the food product 14 stored within the housing 12 on the drive shaft 18.

In at least one embodiment, the medium is pressurized. In at least one embodiment, the pressurized medium includes a fluid. In at least one embodiment the fluid includes a food grade grease. It will also be appreciated that the pressurized fluid may be a cleaning solution for flushing out and maintaining the seal assembly 24. In at least one embodiment the pressurized medium includes a gas. In at least one embodiment, the gas includes carbon dioxide. In the examples shown in FIGS. 6-9 a tank 56 of pressurized carbon dioxide gas may be operably coupled to the seal assembly 24 via a conduit 58 which passes through a pressure regulator 60 and a valve 62. The conduit 58 is operably coupled to the conduit 26 of the seal assembly 24. In another example food grade grease 64 may be operably coupled to the seal assembly 24 via conduit 58. The pressurized carbon dioxide gas or food grade grease flows through the at least one retaining means aperture 36 where it enters the at least one seal aperture 52. The pressurized carbon dioxide gas fills the seal central reservoir space 50 to apply a seal pressure against the drive shaft 18.

Figure 7:
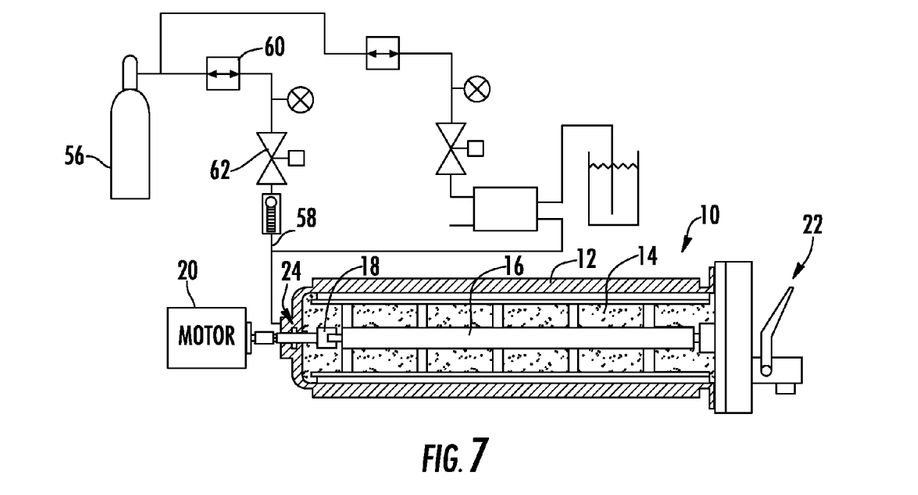
FIG. 7 is a cross-sectional schematic diagram of a dispensing system with a pressurized medium flowing through the seal assembly according to at least one embodiment of the present disclosure.
Figure 8:
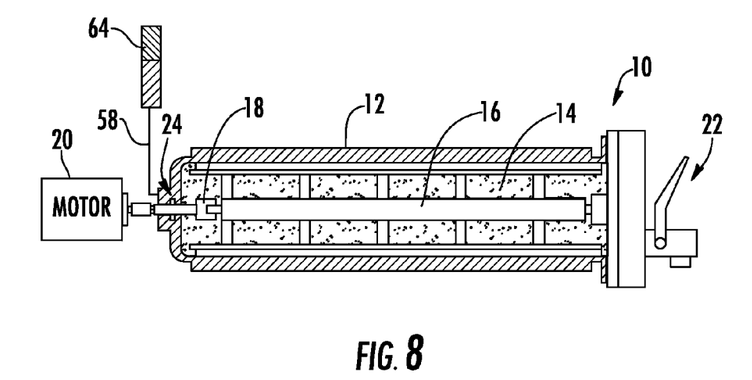
FIG. 8 is a cross-sectional schematic diagram of a dispensing system with a pressurized medium flowing through the seal assembly according to at least one embodiment of the present disclosure.
Figure 9:
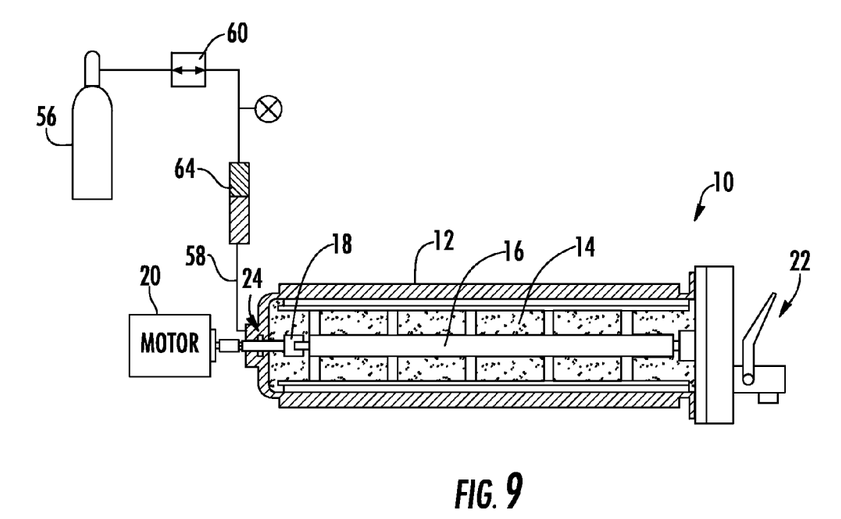
FIG. 9 is a cross-sectional schematic diagram of a dispensing system with a pressurized medium flowing through the seal assembly according to at least one embodiment of the present disclosure.

It will be appreciated that the seal assembly 24 includes at least one conduit 26 and an annular resilient seal member 30 formed from a u-cup seal including an seal outer perimeter 46, an inner perimeter 48, and a seal central reservoir space 50 to dispense a pressurized medium through the at least one conduit 26 and into the annular resilient seal member 30 to improve a seal on the drive shaft 18 and reduce the incidence of food product leakage between the seal assembly 24 and the drive shaft 18. It will also be appreciated that cleaning solutions, as shown in FIG. 7, may be dispensed through the at least one conduit 26 to reduce maintenance cost, allow for automated cleaning, and reduce the likelihood that the annular resilient seal member 30 is improperly cleaned or reassembled.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A seal assembly comprising:
   at least one conduit configured to allow a medium to flow therethrough; and
   an annular retaining member operably coupled to the conduit;
   an annular resilient seal member disposed in the annular retaining member, the resilient seal member comprising a unified u-cup seal including a seal outer perimeter, a seal inner perimeter, and a seal central reservoir space formed between the seal outer perimeter and the seal inner perimeter, wherein the seal central reservoir space is constructed and arranged to be filled by a fluid to pressurize the resilient seal member.

2. The seal assembly of claim 1, wherein the annular retaining member includes a front surface, a rear surface, and at least one retaining means aperture penetrating the front surface and the rear surface.

3. The seal assembly of claim 2, wherein the rear surface comprises at least one resilient ridge to form at least one retaining member cavity therein.

4. The seal assembly of claim 3, wherein the at least one conduit engages the at least one retaining member aperture on the front surface.

5. The seal assembly of claim 1, wherein at least one seal aperture is disposed through the seal outer perimeter into the seal central reservoir space.

6. The seal assembly of claim 5, wherein the resilient seal member is disposed in one of the at least one retaining member cavities.

7. A dispensing system for food and beverage products comprising:
   a drive shaft, including a rotatable outer surface; and
   a sealing assembly configured to engage the drive shaft outer surface;
   wherein the seal assembly comprises:
      at least one conduit configured to allow a medium to flow therethrough;
      an annular retaining member operably coupled to the at least one conduit; and
      an annular resilient seal member disposed in the annular retaining member, the resilient seal member comprising a unified u-cup seal including a seal outer perimeter, a seal inner perimeter, and a seal central reservoir space formed between the seal outer perimeter and the seal inner perimeter, wherein the seal central reservoir space is constructed and arranged to be filled by a fluid to pressurize the resilient seal member.

8. The dispensing system of claim 7 further comprising:
   a housing;
   a dispensing mechanism operably coupled to the housing;
   a stirring mechanism disposed within the housing, wherein the stirring mechanism is operably coupled to the drive shaft; and
   a motor operably coupled to the drive shaft for rotating the stirring mechanism.

9. The dispensing system of claim 8, wherein the housing is refrigerated.

10. The dispensing system of claim 8, wherein the annular retaining member is configured to engage the housing.

11. The dispensing system of claim 10, wherein the annular retaining member includes a front surface, a rear surface, and at least one retaining member aperture penetrating the front surface through the rear surface.

12. The dispensing system of claim 11, wherein the rear surface comprises at least one resilient ridge to form at least one retaining member cavity therein.

13. The dispensing system of claim 12, wherein the at least one conduit engages the at least one retaining member aperture on the front surface.

14. The dispenser claim 7, wherein at least one seal aperture is disposed through the seal outer perimeter into the seal central reservoir space.

15. The dispenser claim 14, wherein the resilient seal member is disposed in one of the at least one retaining member cavities.

16. The dispenser of claim 15, wherein seal inner perimeter is in contact with the rotatable drive shaft outer surface.

* * * * *